United States Patent
Bourke et al.

[15] 3,656,006
[45] Apr. 11, 1972

[54] TOLERABLE VOLTAGE CONTROL CIRCUIT

[72] Inventors: Robert F. Bourke, Oconomowoc; Jon W. Simons, Cudahy, both of Wis.

[73] Assignee: The Louis Allis Company

[22] Filed: Jan. 16, 1970

[21] Appl. No.: 3,368

[52] U.S. Cl. .....................307/252 M, 307/305, 323/22 SC, 328/118, 330/69
[51] Int. Cl. ......................................................H03k 17/00
[58] Field of Search ..........307/305, 252.72, 252.74, 252.55, 307/252.53; 323/22 SC; 330/300, 69; 328/118

[56] References Cited

UNITED STATES PATENTS

| | | | |
|---|---|---|---|
| 3,358,218 | 12/1967 | Halpin | 323/22 |
| 3,518,527 | 1/1970 | Russell | 307/252 Q |
| 3,478,257 | 11/1969 | Kyr | 307/252 Q |

*Primary Examiner*—Donald D. Forrer
*Assistant Examiner*—David M. Carter
*Attorney*—Alfred B. Levine, Alan C. Rose and Daniel D. Fetterley

[57] ABSTRACT

With capacitive commutation, the controlled rectifiers of an inverter can be subjected to large voltages at the time of firing. To inhibit firing until the voltage across each controlled rectifier has decreased to safe levels, the present invention employs a switchable amplifier for each controlled rectifier which is responsive to the voltage across the controlled rectifier. The amplifier has two thresholds for switching from a firing-inhibit state to a permit-to-fire state. One threshold, established by a reference voltage and resistor divider, is set to the maximum tolerable voltage for the controlled rectifier. The second threshold permits lower level firing and because it is established by the positive amplifier feedback, this threshold is removed when the amplifier switches. Thus, the amplifier contains switching hysteresis enabling firing of the controlled rectifier at a low voltage, but insuring that if the voltage across the controlled rectifier rises above the low threshold it can still be fired within the maximum tolerable level.

4 Claims, 2 Drawing Figures

Patented April 11, 1972

INVENTOR.
ROBERT F. BOURKE
JON W. SIMONS
BY

INVENTOR.
ROBERT F. BOURKE
JON W. SIMONS

3,656,006

TOLERABLE VOLTAGE CONTROL CIRCUIT

GOVERNMENT LICENSE

The invention herein described was made under a subcontract with the United States Navy.

1. Field of the Invention

This invention relates to controlled rectifier protection circuits and more particularly to a firing protection circuit for the controlled rectifiers of a capacitor commutated inverter.

History of the Art

Switch elements, such as transistors, thyristors, and particularly controlled rectifiers, are sometimes used in circuits where they are exposed to high voltages at the time of firing such as, for example, the controlled rectifiers in a capacitor commutated inverter. In a capacitor commutated inverter the charge on the commutating capacitor is applied to reverse bias the off-going controlled rectifier before the next controlled rectifier is fired. The capacitor voltage is then discharged through the load. However, if the oncoming controlled rectifier is fired before the capacitor voltage is discharged, the controlled rectifier will be exposed to the high capacitive voltage, and since a triggered controlled rectifier represents a very low impedance, all the capacitor energy will be discharged through the controlled rectifier causing the controlled rectifier to be destroyed.

Normally, the solution for solving this problem is the employment of a time delay in the firing circuit for the controlled rectifier to insure that the capacitor is discharged by the load before the controlled rectifier is fired. This solution, however, is insensitive to the actual conditions being experienced by the controlled rectifier being protected. A heavy load quickly discharges the capacitor. A light load slowly discharges the capacitor, and when the power factor of the load approaches unity, the current can reverse before the capacitor is fully discharged to cause the capacitor voltage and thus the voltage across the controlled rectifier to increase. In addition, the supply voltage can vary, altering the charge on the commutating capacitor. Accordingly, with a time delay as the means to protect the controlled rectifier, the designer is faced with choosing between a long delay to compensate for the worst conditions, thereby lowering the efficiency and speed of operation of the inverter, or lesser delays, inviting possible harm to the controlled rectifiers.

SUMMARY OF THE INVENTION

Inhibiting a switch element from firing until the voltage across it is at a safe level by monitoring this voltage is a solution which is sensitive to the conditions being experienced by the switch element. This solution utilizes a control device responsive to the voltage across the switch element to inhibit the firing of the switch element until the voltage thereacross reaches a safe level. This safe level is established by a voltage switching threshold for the control device which when traversed by the decreasing voltage across the switch element causes the control device to release the switch element firing inhibit. Because the voltage level across the switch element can increase, as was explained for inverters having light loads with near unity power factors, it is desirable that the threshold be removed once the voltage across the switch element has reached this low level to prevent the inhibit from being reinstated as the voltage rises. A second threshold is provided corresponding to the maximum tolerable voltage level for the switch element to reapply the inhibit if the voltage increases to this value. The two threshold levels, one permanent and one transiently applied, affords the control device a hysteresis of operation to compensate for the range of conditions to which the switch element may be exposed.

In general, a switchable amplifier is provided for each switch element being protected. This amplifier is responsive to the voltage across the switch element. A reference voltage is applied to establish the maximum tolerable firing voltage threshold level. Positive feedback from the amplifier output to the amplifier input establishes a lower overriding threshold. When the voltage across the switch element decreases to the lower threshold the amplifier switches, thereby removing the positive feedback, and the level for reestablishing the inhibit becomes the higher threshold for the maximum tolerable level.

BRIEF DESCRIPTION OF THE DRAWINGS

The features and advantages of the invention will be better understood from the following detailed description taken in conjunction with the drawings, wherein.

DETAILED DESCRIPTION

For the purpose of this description, the switch elements being protected by the control circuit of the present invention are the controlled rectifiers of a capacitor commutated inverter and the term "controlled rectifier" will be used throughout.

Figure 1:
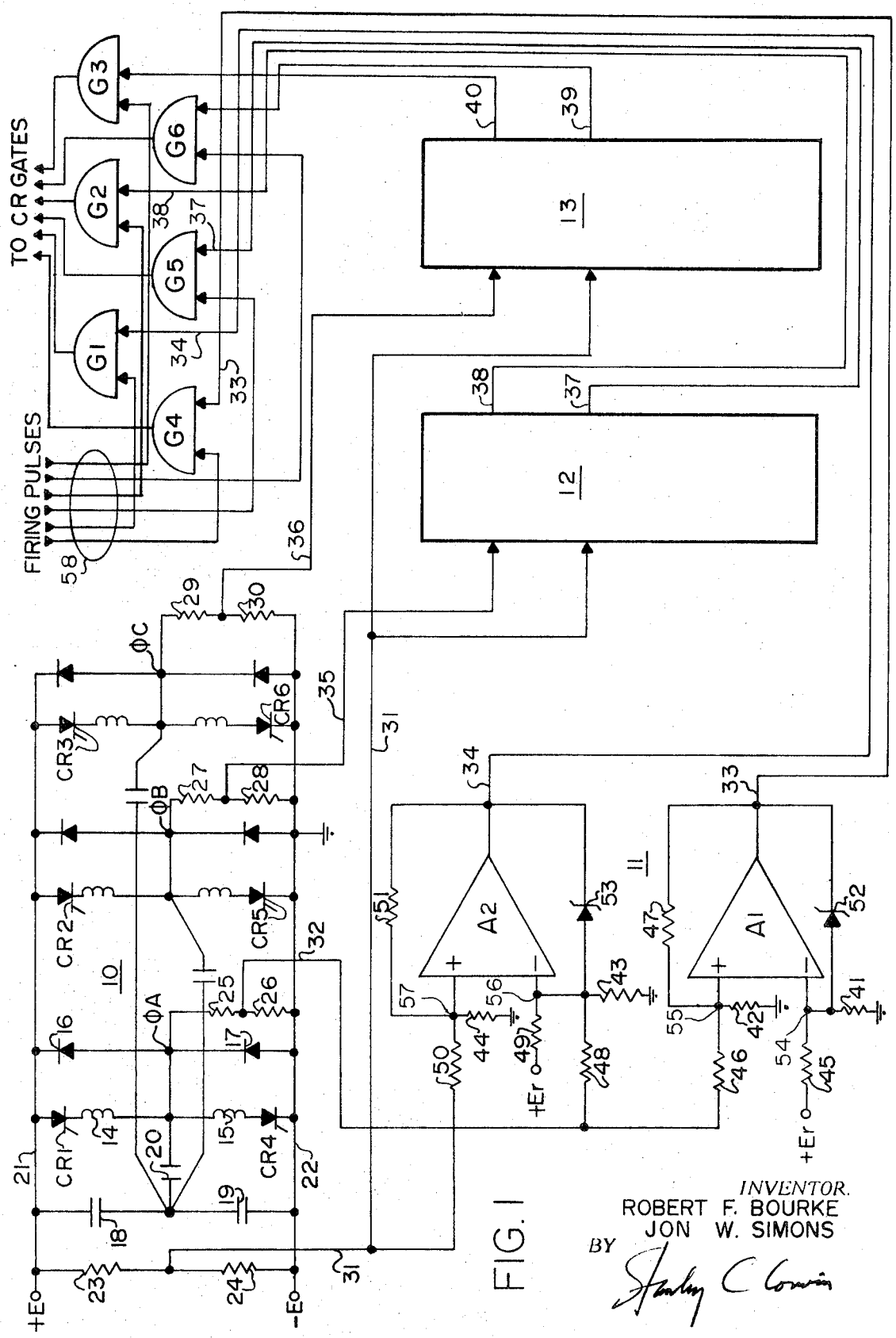
FIG. 1 is a block and schematic diagram of a voltage control circuit according to the invention used to protect the controlled rectifiers of an inverter.

Referring now to FIG. 1, there is shown an inverter 10, a control circuit 11 for the phase A (ΦA) controlled rectifiers CR1 and CR4 of the inverter, control circuits 12 and 13 identical to control circuit 11 for the phase B and phase C inverter controlled rectifiers, and gates G1–G6 which inhibit firing pulses from being applied to the controlled rectifiers in response to inhibit outputs from the amplifiers in the control circuits.

Inverter 10 is a capacitor commutated inverter of the type shown and described in U.S. Pat. No. 3,331,011, issued July 11, 1967. The inverter includes for each phase a pair of controlled rectifiers, a commutating capacitor such as capacitor 20 for controlled rectifiers CR1 and CR4, commutating transformer secondary windings 14 and 15 to initiate commutation, and a pair of diodes such as diodes 16 and 17 which along with the conducting controlled rectifier complete the current path between the load and the input bus. The circuitry for phase B and phase C of the inverter is identical to that described for phase A and is shown without reference numerals. The remaining elements of the inverter circuitry include capacitors 18 and 19 which establish a mid-bus voltage for the commutating capacitors and voltage dividers which form part of the control circuit of the present invention. The resistor 23, 24 voltage divider across the input buses 21 and 22 establishes a voltage proportional to the +E voltage on bus 21, i.e., proportional to the voltage on the anode of CR1. The voltage divider made up of resistors 25 and 26 develops a voltage proportional to the CR1 cathode-CR4 anode voltage. These two voltage dividers derive the necessary phase A voltages for the control circuit 11. The resistor 27, 28 divider and resistor 29, 30 divider provide the phase B and phase C voltages for control circuits 12 and 13. Since the +E voltage also appears at the anode of controlled rectifiers CR2 and CR3, the resistor 23, 24 voltage divider output is also applied to control circuits 12 and 13 by lead 31.

It should be noted that the voltage dividers serve only to step down the voltage to control circuitry levels and as such are not essential to the invention. Thus, for example, other voltage step-down devices could be used. Or, with suitable components, the voltages appearing across the controlled rectifiers could be applied directly to the control circuitry.

In inverter 10 and others of the type where the controlled rectifiers are turned off prior to firing other controlled rectifiers, each controlled rectifier about to be fired is subjected to a decreasing voltage from the previous commutation as the charge on the commutating capacitor decreases. Controlled rectifiers CR4, for example, will experience a decreasing voltage when one of the controlled rectifiers in the upper group of controlled rectifiers, such as CR1, is turned off. This commutation of CR1 is occasioned by a pulse appearing across the secondary winding 14. The voltage pulse across transformer winding 14, in addition to the voltage across capacitor 20, reverse biases controlled rectifier CR1 to turn this device off. With no current flowing into capacitor 20 to maintain its charge, the voltage thereacross reduces as the capacitor discharges into the load and because the capacitor voltage appears across controlled rectifier CR4, the controlled rectifier could be destroyed if fired before discharge reduces the voltage to a safe level.

Control circuit 11 is employed in the inverter power supply system shown in FIG. 1 to provide a solution to the controlled rectifier firing — capacitor discharging problem. Control circuit 11 includes a high gain differential amplifier A1 responsive to the voltage across controlled rectifier CR4, and a similar amplifier A2 responsive to the voltage across controlled rectifier CR1. These amplifiers are selected to switch in response to a change in the polarity difference between the two voltage inputs thereto. Thus, if the voltage at the plus terminal 55 of amplifier A1 is positive with respect to the voltage at the minus terminal 54, the amplifier will be in its first state of conduction. When the plus voltage input becomes negative with respect to the minus voltage input, i.e., less positive than the minus voltage input, amplifier A1 switches to its second state of conduction.

If resistor 45 and voltage +Er is ignored, the minus input of amplifier A1 is substantially at the voltage level of the common bus 22 due to resistor 41 and the common connection shown. If resistor 47 is also disregarded, the plus input is responsive to the voltage at the anode of CR4 via the resistor 25, 26 voltage divider and resistors 46 and 42 causing amplifier A1 to be responsive to the voltage across CR4. Because amplifier A1 switches when the voltage at terminal 55 becomes less positive than the voltage at terminal 54, the voltage level for switching is established by adding voltage +Er to terminal 54 via resistor 45.

Figure 2:
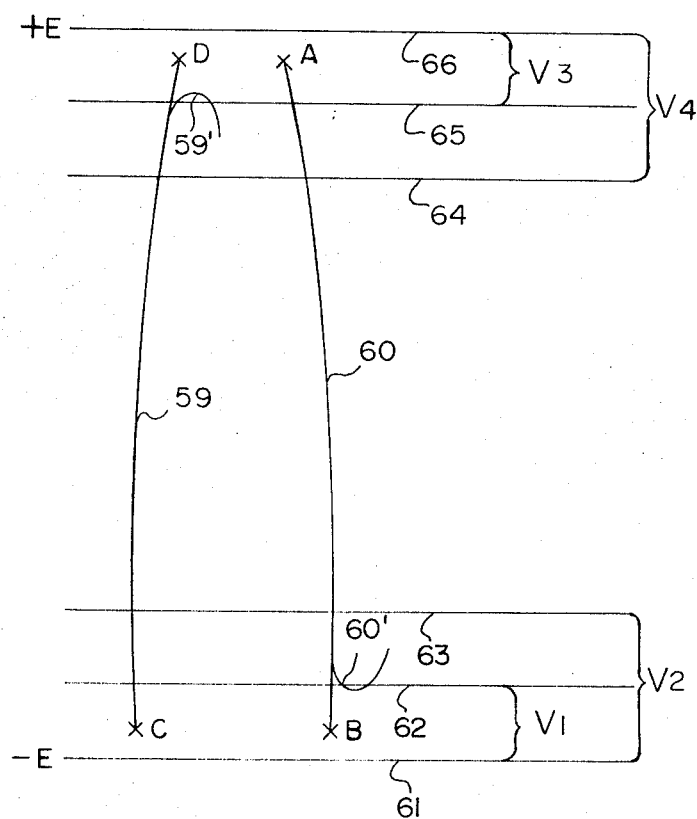
FIG. 2 is a graph of the voltage across the controlled rectifiers being protected and the threshold levels for the control circuit of FIG. 1.

The threshold switching voltage for amplifier A1 established by reference voltage +Er and resistor 45 can be seen graphically in FIG. 2. FIG. 2 shows the voltage 60 across controlled rectifier CR4 and the voltage switching thresholds 62, 63 and 64, 65 for amplifiers A1 and A2, respectively. Voltage 60 is shown decreasing from a high point A near the positive bus +E to a low point B near the common bus designated −E so that it crosses threshold 63 at voltage level V2, established by reference voltage +Er and resistor 45, and threshold 62 at voltage level V1, established by resistor 47 as hereafter described.

If the lower threshold 62 is disregarded, when the voltage 60 across CR4 crosses the higher threshold 63, which can be set at the maximum tolerable level for firing the controlled rectifier by selection of the values of +Er and resistor 45, amplifier A1 will switch from its inhibit state of conduction to a noninhibit state. Zener diode 52 limits the voltage output swing of amplifier A1 in its two states of conduction. When amplifier A1 is in its inhibit state, the Zener will clamp its positive voltage output to the breakdown voltage of this device, e.g., 10 volts, and when the amplifier switches to its low or negative voltage noninhibit state, the Zener will clamp the output to the common level near zero volts via its forward conduction path and resistor 41. Gate G4 responds to the output of amplifier A1 to prevent a firing pulse from being applied to the control electrode of CR4 so long as amplifier A1 is in the positive voltage output state. As such, the gates G1–G6 may comprise AND gates responsive to both a near zero volt output from the associated amplifier and a near zero firing pulse to apply a positive pulse to the control electrode of the corresponding controlled rectifier.

The voltage established by reference voltage +Er and resistor 45 at the minus input of amplifier A1 is the maximum tolerable voltage for firing the controlled rectifier. This level serves merely to insure that the device will not be destroyed when fired. However, normally the voltage across the controlled rectifier will drop substantially below this maximum tolerable voltage when the upper conducting controlled rectifier has been commutated, and therefore it is desirable to fire controlled rectifier CR4 at a lower voltage. Lower voltage firing preserves the controlled rectifier and enables smaller size controlled rectifiers to be used. Thus, a positive feedback voltage is added to the plus terminal of the amplifier by feedback resistor 47 to insure that the controlled rectifier will be fired when the voltage across this device drops to a value low enough to compensate for the added positive voltage and becomes less positive than the voltage level of the minus input to fire the amplifier. The value of resistor 47 is selected to establish a threshold for amplifier A1 which the voltage across controlled rectifier CR4 will reach under any load on the inverter for any value bus voltage.

With the addition of feedback resistor 47, amplifier A1 has two switching threshold levels. Since positive feedback voltage added to the plus input of this amplifier produces the same effect as negative feedback voltage added to the minus input, i.e., reducing the positive voltage at the minus input established by reference voltage +Er, it would appear that the lower threshold 62 shown in FIG. 2 is the only effective threshold. This is true. When the voltage across CR4 is decreasing from a value above threshold 63, amplifier A1 will fire only when that voltage reaches threshold 62. However, once amplifier A1 switches to its near zero voltage output state, the lower threshold established by the positive feedback is removed and the higher maximum tolerable voltage threshold remains. This is desirable because with light near unity power factor loads the load current may reverse directions to again charge commutating capacitor 20 before the firing pulse can be applied to CR4 to fire it. This condition is illustrated in FIG. 2 by curve 60'. Were it not for the hysteresis of switching threshold provided by the removal of this low threshold and the reestablishment of the higher threshold level 63 when amplifier A1 switches, this amplifier would switch back when the voltage 60' rose above level 62 which might occur before a firing pulse appears at gate G4 and the firing of CR4 would be unnecessarily inhibited. Because the threshold 62 is chosen to be above the lowest level to which capacitor 20 discharges even with a light near unity power factor load, amplifier A1 will fire as soon as threshold 62 is traversed by the voltage across CR4.

Amplifier A2 with its attendant circuitry is basically similar to amplifier A1. Amplifier A2 is responsive to the voltage across controlled rectifier CR1, to a reference voltage +Er at its minus terminal and to a positive feedback voltage via resistor 51. However, the voltage across CR1 is not fixed at one terminal thereof such as is the case with controlled rectifier CR4. Both the voltage at the annode of CR1 and the voltage at the cathode thereof are positive voltages which while proportional to each other may have different values at different times. Thus, with resistor 23, 24 and 25, 26 voltage dividers selected to provide voltage levels suitable for application to amplifier A2, resistors 48, 43 and 50, 44 are selected such that the voltage at input 56 will equal the voltage at input 57 when the phase A output is equal to the voltage at bus 21. Thus, by introducing resistor 49 and the reference voltage +Er, the proper offset between the two inputs to amplifier A2 is established. This reference voltage and resistor again establish the maximum tolerable voltage across the controlled rectifier. Reference to FIG. 2 is again made to witness that the operation of amplifier A2 is in all respects identical to the operation as described for amplifier A1.

FIG. 2 shows the voltage across CR1, during the period between the commutation of a lower conducting controlled rectifier and the firing of this upper controlled rectifier, as a decreasing voltage 59 from point C at near full bus voltage to point D near zero voltage. The threshold for maximum tolerable voltage across the device for firing is indicated by horizontal line 64 at V4 volts, and the threshold provided by feedback resistor 51 for normal firing is level 65 at voltage V3.

Many changes from the preferred embodiment described are possible without departing from the teachings set forth.

For example, the positive feedback voltage applied to the plus input of a switchable amplifier could be replaced by a negative feedback voltage applied to the minus input thereof. By this means, the two input amplifier could be replaced by a single input amplifier with appropriate polarity inverters.

It should be understood that while a particular inverter has been shown to illustrate the operation of the control circuit, that this is only one of many situations where controlled rectifiers or other switch elements are exposed to high and decreasing voltages when they are to be fired. In such circumstances a control circuit of the type described provides the protection needed for safe firing of the device.

What is claimed and desired to be secured by Letters Patent of the United States is:

1. A control circuit for controlling the firing of a switch element in accordance with a voltage impressed thereacross, said circuit comprising an amplifier switchable in response to voltage levels applied thereto, said amplifier being responsive to the voltage across said switch element, means for applying a threshold voltage level to said amplifier determinative of a safe voltage across said switch element to permit firing, means establishing a threshold hysteresis for said amplifier by removably applying an initial threshold voltage level lower than said safe voltage threshold level, and means responsive to said switchable amplifier to inhibit firing of said switch element until the voltage across said switch element reaches a level low enough to cause said switchable amplifier to switch, said amplifier being switched and said initial threshold being removed whenever the voltage across said switch element decreases to said initial threshold level, the threshold level for said amplifier reverting to said safe voltage level and said amplifier being prevented from further switching until the voltage across the switch element increases to said safe voltage threshold level.

2. A control circuit as recited in claim 1 wherein the means for establishing said threshold hysteresis provides the initial threshold voltage level for said amplifier in response to the output of said amplifier prior to the voltage across the switch element reaching a level low enough to cause said switchable amplifier to switch.

3. A control circuit as recited in claim 2 wherein said amplifier includes first and second inputs and an output, and said switch element includes first and second power terminals and a firing pulse receiving control terminal, said control circuit further including means responsive to the voltage at one power terminal of said switch element for presenting a voltage proportional thereto to the first input of said amplifier, and means responsive to the voltage at the other power terminal for presenting a voltage proportional thereto to the second input of said amplifier, wherein said means for establishing said safe voltage threshold level is a reference voltage independent of the voltage across said switch element, said reference voltage being applied to the second input of said amplifier, wherein said hysteresis means is a feedback resistor coupling positive feedback to the first input from the output of said amplifier, and said means to inhibit firing prevents firing pulses from being applied to said control terminal until the voltage at the first input of said amplifier becomes less than the voltage at said second input.

4. A tolerable firing voltage control circuit for controlling the firing of a pair of inverter phase switch elements in accordance with voltages impressed across the elements, said elements being connected in series between the positive and negative input power buses of the inverter, said control circuit comprising:

first and second amplifiers switchable in response to voltage levels applied thereto, said first amplifier being responsive to the voltage across the switch element of said pair connected to the positive bus and said second amplifier being responsive to the voltage across the other switch element of said pair, means establishing a threshold voltage level for switching each amplifier at a predetermined maximum tolerable voltage for each switch element, said threshold voltage levels being fixed and independent of the voltage across each switch element, means establishing a threshold hysteresis for each amplifier by providing a voltage threshold level for each amplifier lower than the maximum tolerable level in response to voltages across said switch elements higher than the maximum tolerable level and removing said lower voltage threshold level when the voltage across a switch element decreases below said lower level to switch the amplifier, said maximum tolerable threshold remaining for permitting the switch element to be fired even if the voltage across the switch element rises above the lower voltage threshold level, and gate means responsive to the switching of each amplifier to permit firing of the related switch element so long as the voltage across the element remains below the predetermined maximum tolerable level.

* * * * *